United States Patent Office 3,488,827
Patented Jan. 13, 1970

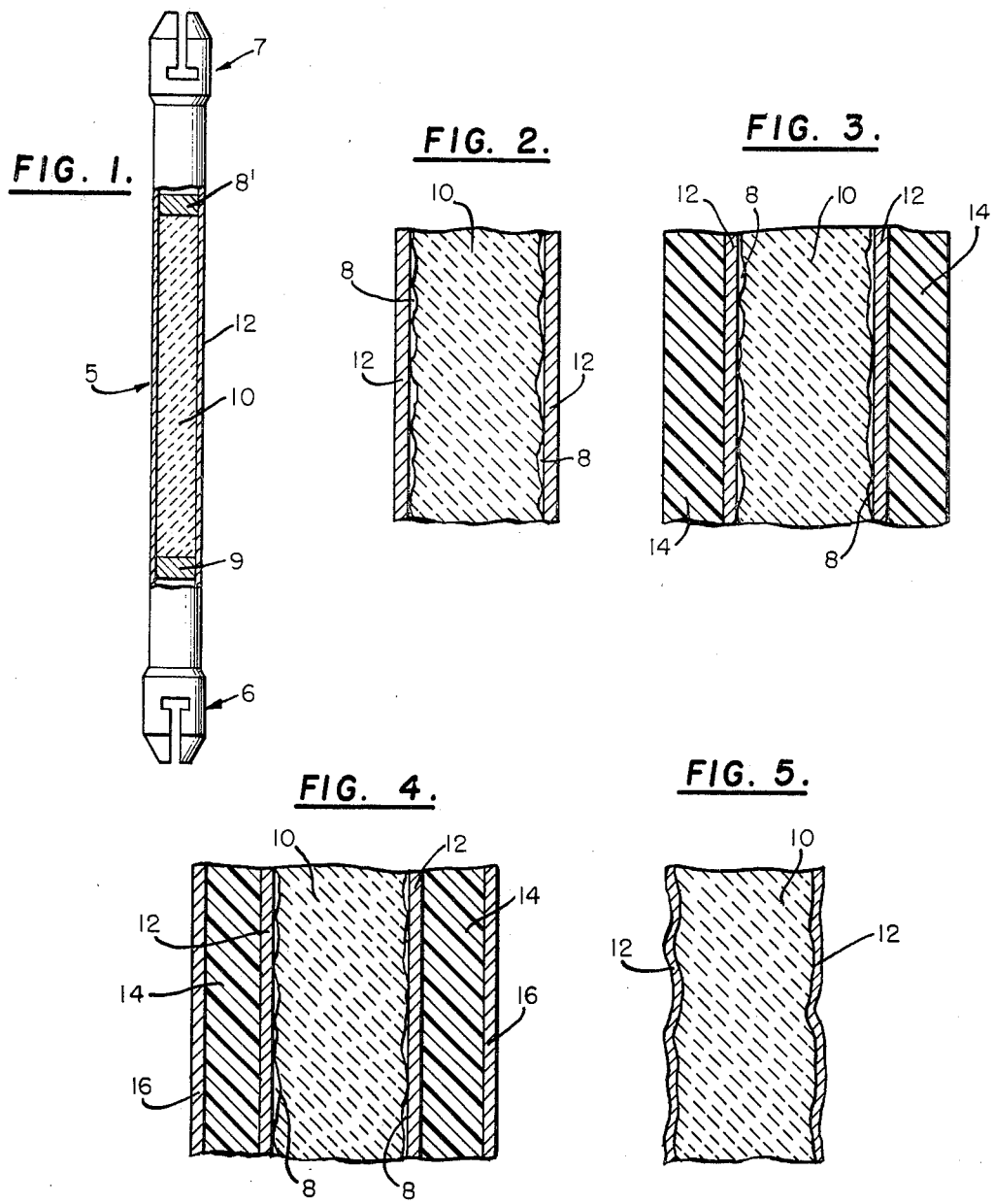

3,488,827
FUEL ELEMENT
Louis J. Aerts and Hubert F. J. G. Bairiot, Mol, and Philippe L. Van Asbroeck, Brussels, Belgium, assignors to Societe Belge pour l'Industrie Nucleaire, S.A., and Centre d'Etude de l'Energie Nucleaire, both of Brussels, Belgium, both corporations of Belgium
Filed Mar. 3, 1967, Ser. No. 620,489
Int. Cl. B23p 9/00
U.S. Cl. 29—423    8 Claims

ABSTRACT OF THE DISCLOSURE

This invention pertains to an improved method for manufacturing fuel elements for nuclear reactors by surrounding the fuel elements with an envelope of synthetic plastic material and thereafter applying deformation forces to the synthetic plastic envelope in order to decrease or completely remove any gaps existing between the nuclear fuel material and its surrounding casing.

BACKGROUND

A classical fuel element for nuclear reactors is generally composed of nuclear fuel used in any known form—as for instance in the form of pellets, spheres, powders, or grains—surrounded by a metallic canning or cladding.

It is known that such a canning often does not exactly fit the fuel, thus giving rise to one or more gaps which can constitute a significant barrier to the transfer of heat between the fuel and the coolant. In order to reduce such gaps, the classical treatment of fuel elements generally involves the application of an isostatic pressure on the fuel elements. However, this is not satisfactory because it requires expensive equipment and complicated manipulation.

BRIEF SUMMARY OF THE INVENTION

The present invention has for its object a new method that is intended to reduce or eliminate any gaps which may exist between the casing and the nuclear fuel in a fuel element.

The method according to the invention consists in applying a pressure to the canning of a fuel element through the instrumentality of a plastic material. This method permits the can to be spaced very closely against the fuel by the use of simple means that are not cumbersome and which require only elementary equipment.

The method according to the present invention offers in addition the advantage of enabling the use of a non-isostatic deformation force in order to obtain very good results, in particular with respect to the improvement in heat transfer.

The method of the invention has the further advantage that it clamps the canning closely around the fuel so as to reduce relative movement between them. This constitutes an important safety factor for nuclear reactors, and especially for fast breeders.

BRIEF DESCRIPTION OF THE SEVERAL VIEWS OF THE INVENTION

FIGURE 1 is a cross sectional view of a typical type of fuel element to which this invention is applicable.

FIGURES 2 through 5 are fragmentary cross sectional views of a fuel element as it goes through the sequence of steps taught by this invention.

DETAILED DESCRIPTION

Referring now to FIGURE 1, it will be seen that this fuel element comprises a head portion 7, a foot portion 6, and intermediate the head and foot is a case 12 (of adequate mechanical resistance) which contains nuclear fuel 10 (such as the oxides and carbides of uranium and/or plutonium). The nuclear fuel 10 may be in the form of pellets or in the form of a solid block, and is maintained in the desired position within the casing 12 by means of plugs 8' and 9. The casing 12 may consist of stainless steel, zircalloy, high nickel alloys, niobium and molybdenum alloys, and the like. The preferred thickness is between about 0.2 and 0.8 mm.

FIGURE 2 is a cross sectional view which illustrates that even though the casing 12 closely surrounds the nuclear fuel 10, a number of gaps can exist and these gaps do constitute a significant barrier to the transfer of heat from the nuclear fuel 10 to the casing 12 and the surrounding cooling medium.

According to the first embodiment of my invention, the arrangement shown in FIGURE 2 is surrounded by an envelope of plastic material 14. The plastic material may for instance be a polyvinyl chloride resin, polyvinylidene chloride resin, a polystyrene resin, a polyester resin, a polyamide resin, a polyether resin, a polyurethane resin, or the like, and although the thickness of the plastic envelope is not critical, a thickness of between 1 and 2 millimeters is preferred. Non-isostatic deformation forces, such as forging (hammering, rotary swaging) may thereafter be applied to plastic envelope 14 and, since the plastic envelope is not very compressible, the applied deformation force will be transmitted rather uniformly to the casing. After this mechanical treatment, the envelope of plastic material is removed from around the casing 12 (e.g. by stripping) and the thus-treated fuel element would appear as is shown in FIGURE 5, containing practically no gaps, as can easily be seen by contrasting FIGURES 2 and 3.

It will be obvious to those skilled in this art that it is possible to envelop the casing 12 with synthetic resin in a number of different ways. For example, if the synthetic plastic material is in tubular form it can be simply slipped over the casing 12. Alternatively, strips of plastic material could be wound helically around the casing 12. It is also conceivable that the casing could be dipped one or more times in molten plastic or sprayed with liquid plastic which would thereafter solidify.

According to a second embodiment of our invention, the fuel element in the form shown in FIGURE 2, (containing gaps 8) is first surrounded by an envelope of plastic material 14 and then further surrounded by the metallic tube 16 (made of iron, copper, alloys, or the like and about .2 mm. thick) as is shown in FIGURE 4. This assembly is then subjected to the same sort of mechanical deformation treatment (such as forging, hammering, rotary swaging) as was previously described, and the applied, localized deformation forces are transmitted uniformly to the casing 12 through the plastic envelope 14 to thus reduce or eliminate gaps. Following this mechanical treatment, the metallic tube 16 and the plastic material 14 are removed (as by stripping or cutting) and the resulting fuel element will appear as is shown in FIGURE 5, having either no gaps or a greatly reduced number of gaps.

In conclusion, while the foregoing specification and drawing describe the construction, of preferred embodiments of the instant invention, it is to be understood that we do not intend to limit ourselves to the precise constructions and arrangements herein disclosed, since the various details of construction, form and arrangement may obviously be varied to a considerable extent by anyone skilled in the art without really departing from the basic principles and novel teachings of this invention and without sacrificing any of the advantages of the invention, and accordingly it is intended to encompass all

What is claimed is:

1. A method for reducing any gaps between the casing and the fuel material in a nuclear fuel element which comprises:
   (a) surrounding the casing with an envelope of synthetic plastic material,
   (b) applying a non-isostatic deformation force to the assembly set forth in (a), and
   (c) removing the envelope of synthetic plastic material.

2. A method according to claim 1, wherein the applied deformation pressure is non-isostatic pressure.

3. A method according to claim 1, wherein said deformation pressure is exerted by forging.

4. A method according to claim 1, wherein the deformation force is applied by hammering.

5. A method according to claim 1, wherein said pressure is applied by rotary swaging.

6. A method according to claim 1, wherein said synthetic plastic material is selected from the group consisting of polyvinylidene chloride resins, polyvinyl chloride resins, polystyrene resins, polyester resins, polyamide resins, polyether resins and polyurethane resins.

7. A claim according to claim 1, wherein the envelope of synthetic plastic material is in turn surrounded by a metallic envelope prior to the application of the deformation force.

8. A claim according to claim 1, wherein the thickness of said envelope of synthetic plastic material is between about 1 and 2 mm.

References Cited

UNITED STATES PATENTS

| 3,089,830 | 5/1963 | McGeary et al. | 29—445 |
| 3,100,742 | 8/1963 | McGeary et al. | 29—480 |
| 3,192,621 | 7/1965 | Bauer et al. | 29—421 X |
| 3,291,870 | 12/1966 | Allison | 29—423 |

THOMAS H. EAGER, Primary Examiner

U.S. Cl. X.R.

29—400, 445